United States Patent
Eidson et al.

(10) Patent No.: US 7,336,683 B1
(45) Date of Patent: Feb. 26, 2008

(54) EFFICIENT COMMUNICATION SYSTEM FOR RELIABLE FRAME TRANSMISSION OVER BROAD SNR RANGES

(75) Inventors: Donald Brian Eidson, San Diego, CA (US); Abraham Krieger, San Diego, CA (US); Ramaswamy Murali, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1031 days.

(21) Appl. No.: 10/464,361

(22) Filed: Jun. 17, 2003

(51) Int. Cl.
*H04J 3/00* (2006.01)
(52) U.S. Cl. ...................... 370/479; 370/485
(58) Field of Classification Search ............ 370/480, 370/485, 497, 216, 225, 349, 259, 261, 262, 370/400, 229, 479
See application file for complete search history.

(56) References Cited

U.S. PATENT DOCUMENTS

| | | | |
|---|---|---|---|
| 5,802,105 A * | 9/1998 | Tiedemann et al. ......... 375/225 |
| 6,522,635 B1 * | 2/2003 | Bedwell ...................... 370/314 |
| 6,535,716 B1 * | 3/2003 | Reichman et al. .......... 455/12.1 |
| 6,741,554 B2 * | 5/2004 | D'Amico et al. ............ 370/225 |
| 6,996,104 B2 * | 2/2006 | Trossen et al. .............. 370/390 |
| 7,058,043 B2 * | 6/2006 | Birdwell et al. ............. 370/349 |
| 2002/0036990 A1 * | 3/2002 | Chodor et al. ............... 370/262 |
| 2003/0157899 A1 * | 8/2003 | Trossen et al. ................ 455/69 |

* cited by examiner

*Primary Examiner*—Chirag G. Shah
*Assistant Examiner*—Ankit P Gandhi
(74) *Attorney, Agent, or Firm*—Farjami & Farjami LLP

(57) ABSTRACT

An exemplary satellite communication system comprises a service provider unit communicably coupled to a number of subscriber units via satellite transmission. The service provider unit includes an encoder configured to encode source data into a serial transmit sequence, and is further capable of supporting at least two modes of operation. The serial transmit sequence includes a first unique word identifying a first mode of operation, and is followed by a first payload packet having a first number of channel symbols corresponding to a source packet encoded in accordance with the first mode of operation identified by the first unique word. The first payload packet is encapsulated by two unique words and the time interval between the two unique words is used to determine the first mode of operation identified by the first unique word.

20 Claims, 5 Drawing Sheets

EFFICIENT COMMUNICATION SYSTEM FOR RELIABLE FRAME TRANSMISSION OVER BROAD SNR RANGES

BACKGROUND OF THE INVENTION

1. Field of the Invention

The present invention relates generally to signal processing systems. More particularly, the present invention relates to communication systems for two-way satellite transmission.

2. Related Art

Satellite service providers are known to provide broadcast satellite communications. With broadcast satellite communications, a service provider is able to provide television and other services to multiple parties over a wide geographical area. More recently, there is a desire to provide two-way data/Internet access via satellite. However, a number of significant issues are present in any two-way data/Internet access satellite system implementation.

For example, a significant issue in such a system is the subscriber's access to the service. Abundant bandwidth (data rates) must be provided to almost all subscribers, most of the time. More importantly, during occasional, inclement weather conditions, a phenomenon commonly referred to as "rain fade" may occur; under such conditions, some availability, albeit at lower data rates, must be provided. A rain fade occurs when a satellite signal passes through storm clouds, resulting in diminished signal-to-noise ratio ("SNR"). A particular concern is the severity of rain fades in the transmission band of interest, e.g., the Ka-band, which can be 10 or more dB in depth.

The conventional approach for addressing the problem of rain fades is to use modulation and coding schemes designed for a worst case SNR scenario. By doing so, reliable, low bit-error-rate ("BER") service to all subscribers is guaranteed with high probability. This approach is typically used in broadcast (single-to-multiparty) satellite communications. However, operation based on worst-case-parameters is not an efficient or economical approach for two-way (single-to-single party) communications, because in most instances, only a small subset of users, at most, are rain faded. Therefore, in most situations, much less coding redundancy is necessary, and many more bits per second could potentially be transmitted, at reliable, low BERs through the system.

The Integrated Services Digital Broadcasting-Satellite ("ISDB-S") standard, which originated in Japan, employs an adaptive modulation and coding scheme, which allows the system operator to select from a set of seven (7) ISDB code rates, including rate 2/3 8-PSK, rates 7/8, 5/6, 3/4, 2/3 and 1/2 QPSK, and rate 1/2 BPSK. In ISDB-S, data packets intended for several users are multiplexed within an ISDB-S superframe, where each packet is encoded according to user code-rate requirements. Thus, in any one ISDB-S superframe, packets for different users may be encoded using up to 4 of the 7 ISDB code rates; in the next ISDB-S superframe, a different subset of the 4 code rates may be selected. ISDB-S, however, includes a number of disadvantages, making it an unpractical and inefficient for two-way satellite communications. First, while ISDB-S provides fine granularity in tracking channel conditions (where, for example, each sponsored code rate is separated by approximately 1 dB), in a practical system, the channel can change by as much as 0.6 dB per second during a rain fade. This is a relatively large change, considering that the physical 2-way round-trip delay over satellite is approximately 0.5 second (ignoring protocol overhead and processing delays). As a result, the channel changes may be too quick for the system to ratchet down by one code rate each time. Furthermore, continual requests for code rate changes can overload the system. This is especially true since the uplink to the satellite (from the consumer premises equipment) is a contention channel, and, thus, if every system in the immediate vicinity is clamoring for change, then the uplink can become overloaded.

Moreover, the ISDB-S superframe size must be undesirably large in order to provide all combinations of different code rates and their frame lengths, i.e., so that they may be packaged within a superframe. Since the ISDB-S superframe is also interleaved to improve concatenated code performance, the decoding delay corresponds to the length of the superframe, which is exceedingly long, e.g., up to 384 MPEG-2 frames. Although for broadcast applications this latency may be adequate, for two-way data communications, the increased latency is significantly problematic. Furthermore, in the ISDB-S approach, the minimum allocations within a superframe are not identical. This makes scheduling of packets being delivered to different users (with different data rate requirements) extremely difficult. In sum, use of ISDB-S is not desirable for two-way data/Internet communications via satellite.

Accordingly, there exists a strong need for an efficient communication system for reliable transmission over broad SNR ranges. There is also a strong need in the art for an efficient and reliable communication system for two-way data/Internet access via satellite transmission.

SUMMARY OF THE INVENTION

The present invention is directed to an efficient communication system and method for reliable frame transmission over broad SNR ranges. The present invention resolves the need in the art for an efficient and reliable communication system for two-way data/Internet access via satellite transmission.

In an exemplary embodiment, a satellite communication system comprises a service provider unit communicably coupled to one or more subscriber units via satellite transmission. The service provider unit includes an encoder configured to encode source data into a serial transmit sequence, and is further capable of supporting at least two modes of operation, such as a robust mode with higher redundancy and a throughput mode for faster data rates. As discussed in greater detail below, the source packets are encoded into payload packets such that the length of a payload packet uniquely identifies the mode of encoding the payload packet. The serial transmit sequence includes a first unique word identifying a first mode of operation, and a first payload packet having a first number of channel symbols corresponding to a source packet encoded in accordance with the first mode of operation identified by the first unique word. The first payload packet is encapsulated by two unique words, wherein one of the two unique words may or may not be the first unique word. The service provider unit further includes a transmitter configured to transmit the serial transmit sequence to a subscriber unit via satellite transmission.

The subscriber unit includes a receiver configured to receive the serial transmit sequence, and a decoder configured to determine the first mode of operation identified by the first unique word by detecting the time interval between the second unique word and the third unique word.

According to another embodiment of the invention, any of the unique words may be selected independently of the other unique words; thus each source packet may be encoded according to one mode independent of the mode used for encoding an immediately preceding source packet and/or immediately following source packet.

According to another embodiment of the invention, the first payload packet further comprises a plurality of data blocks, each of the plurality of data blocks are separated by uncoded pilot symbols, and the uncoded pilot symbols are spaced in regular intervals within the first payload packet. These pilot symbols allow a subscriber unit that is only capable of receiving robust mode packets to maintain carrier phase lock, even when receiving throughput mode packets.

The present invention realizes a number of significant advantages including increased performance, reliability and efficiency over conventional approaches, such as ISDB. For example the present invention provides reduced signaling latency, reduced processing latency, improved FEC performance, higher sponsored code rates for 8-PSK and/or other higher order modulations (e.g., 16-QAM), more efficient packet scheduling due to use of single-size source packets, less complex modulation scheduling through use of only two modes at a time, and increased flexibility in cell assignments due to potentially larger subset of supported code rates. Furthermore, due to the particular implementation employed in the present invention, a subscriber unit can always be reached because the subscriber unit is configured to always demodulate and decode packets that are transmitted in robust mode.

According to another embodiment of the invention, a method for communicating data over satellite transmission in a manner as described above between the service provider unit and the subscriber unit is disclosed. Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2A illustrates an exemplary sequence of source bit packets generated in accordance with one embodiment of the present invention;

FIG. 2B illustrates an exemplary sequence of channel symbol packets encoded in accordance with one embodiment of the present invention;

DETAILED DESCRIPTION OF THE INVENTION

Figure 1:
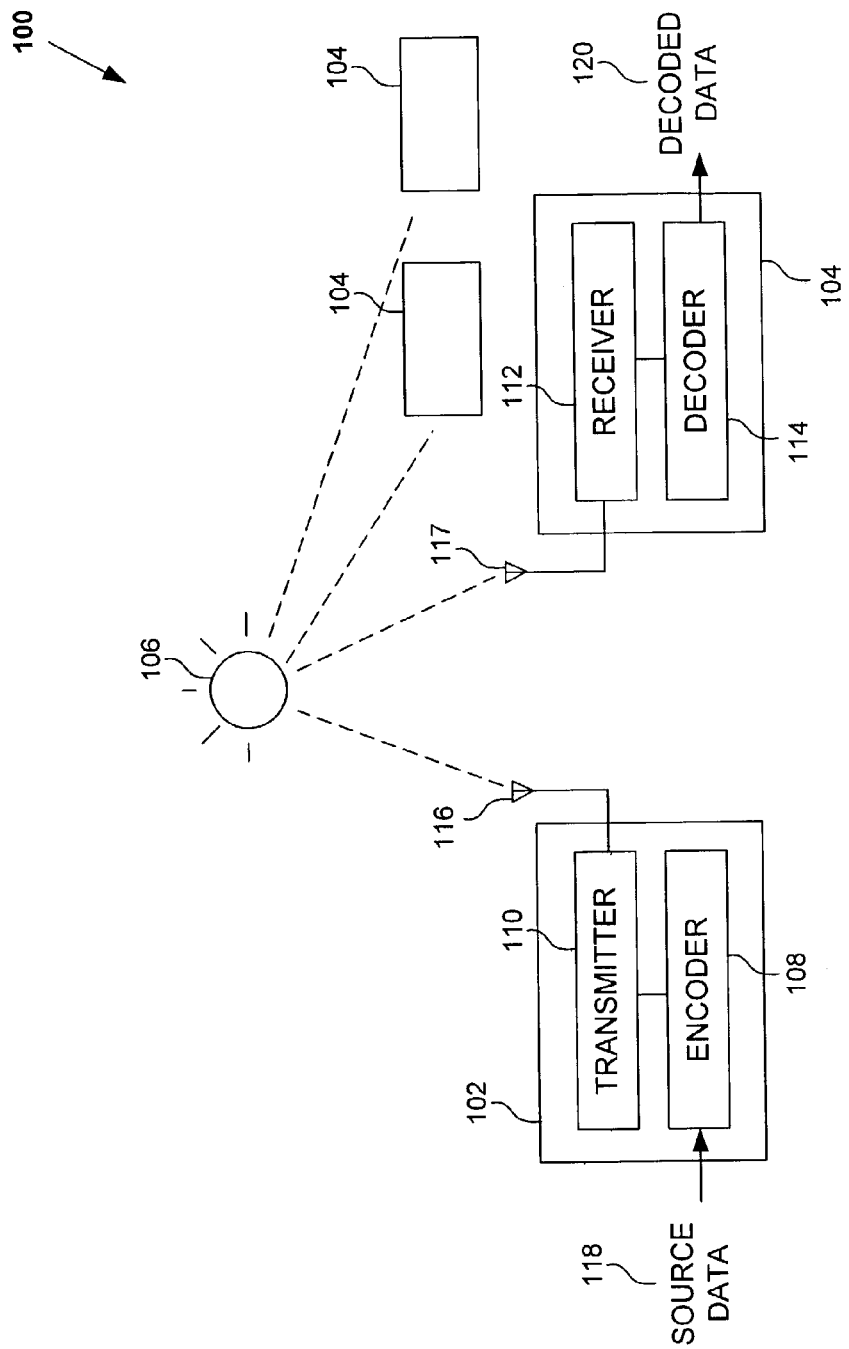
FIG. 1 illustrates a block diagram of a satellite communication system in accordance with one embodiment of the present invention.

The present invention is directed to an efficient communication system for reliable frame transmission over broad SNR ranges. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings. It is noted that, for ease of illustration, the various elements and dimensions shown in the drawings are not drawn to scale.

Referring to FIG. 1, there is generally shown a block diagram of satellite communication system 100 in accordance with one embodiment of the present invention. Satellite communication system 100 includes service provider unit 102 and a number of subscriber units 104. Each subscribers unit 104 is similarly configured and is communicably coupled to service provider unit 102 by satellite 106 via satellite transmission. As discussed in greater detail below, satellite communication system 100 provides efficient and reliable two-way communications between service provider unit 102 and each subscriber unit 104 over broad SNR ranges, such as during clear conditions and during rain fade conditions. For example, satellite communication system 100 can be used to provide efficient and reliable two-way data/Internet access via satellite transmission over a wide geographic region, such as continental coverage across the United States.

Service provider unit 102 comprises encoder 108, transmitter 110 and antenna 116, and subscriber unit 104 comprises decoder 114, receiver 112 and antenna 117. The operation of encoder 108 and decoder 114 are described more fully below in conjunction with FIGS. 2A, 2B, 3, 4 and 5. In general, source data 118 is encoded by encoder 108 into channel symbol packets. According to an exemplary embodiment, the source data 118 may be encoded in one of at least two modes: a robust mode and a throughput mode, each mode corresponding to certain channel conditions. For example, robust mode may be used to deliver lower data rates, e.g., for transmission in rain-faded conditions, for users in disadvantaged locations, users with damaged equipment or smaller (lower gain) subscriber antennas, or users at the periphery of a spot beam of satellite 106, and for urgent or "must receive the first time" messages; throughput mode may be used to deliver higher data rates for transmission, e.g., for transmission during clear sky conditions. It is noted that signal degradation could arise from a number of sources, such as shadowing, edge of footprint, non-line-of-sight or imperfect view of satellite from receiver antenna, damaged or smaller subscriber antenna, etc. In such cases, the robust mode could also be sent such subscribers, even though they have larger (higher gain) dish antennas.

The channel symbol packets are then transmitted by transmitter 110 via antenna 116 to satellite 106. Satellite 106 retransmits the data received from service provider unit 102 to subscriber units 104. Receiver 112 of subscriber unit 104 receives the data transmitted by satellite 106 by way of antenna 117. The received data, i.e., channel symbol packets, are decoded by decoder 114 into decoded data 120 for further processing.

Referring now to FIGS. 2A and 2B, the serial packet transport of both throughput mode and robust mode are generally shown as processed by encoder 108 of service provider unit 102 of FIG. 1 in accordance with one embodiment of the present invention. Packet sequence 200 of FIG. 2A illustrates the sequence of source bit packets. Packet sequence 210 of FIG. 2B illustrates the sequence of channel symbol packets which correspond to respective source bit packets of packet sequence 200 after encoding by encoder 108. For example, throughput mode channel symbol packet 212a corresponds to encoded throughput mode source bit packet 202a, robust mode channel symbol packet 214a corresponds to encoded robust mode source bit packet 204a, and so on. According to an exemplary embodiment, a packet in throughput mode can be followed by a packet in robust mode, and a packet in robust mode can be followed by a packet in throughput mode. Furthermore, as illustrated by packet sequences 200 and 210, the packet sequence is not required to follow a prescribed or predefined order.

Continuing with the particular embodiment shown in FIG. 2A, each source bit packet has the same length regardless of whether the source bit packet is for throughput mode or robust mode transport (it is noted that in other embodiments, the source packets are not required to be the same length). As shown in FIG. 2A, throughput mode source bit packets 202a, 202b, 202c, 202d and 202e have the same length as robust mode source bit packets 204a and 204b. By way of illustration, the length of source bit packets 202a, 204a, 202b, 202c, 202d, 204b and 202e may be 1870 bytes long (corresponding to 10 MPEG-2 frames). In contrast, as shown in FIG. 2B, each of robust mode channel symbol packets 214a and 214b uses a larger number of channel symbols to transport its data than throughput mode channel symbol packets 212a, 212b, 212c, 212d and 212e. As discussed above, throughput mode may be used to deliver higher data rates for transmission, e.g., for transmission during clear sky or better conditions. For example, throughput mode may employ a high-order modulation scheme, such as 8-PSK and/or a higher code rate, such as rate 7/8. Upon receipt by subscriber unit 104, decoder 114 may employ a turbo decoder to decode throughput mode channel symbol packets. As discussed below, decoder 114 may also employ a turbo code as its Forward Error Correction (FEC) encoding scheme. According to another embodiment, decoder 114 may also employ an iterative decoder to decode throughput mode and/or robust mode channel symbol packets.

Robust mode may be used to deliver lower data rates, e.g., for transmission in rain-faded conditions, for users in disadvantaged locations or at the periphery of a spot beam of satellite 106, and for urgent or "must receive the first time" messages. The robust mode may employ a lower-order modulation, such as BPSK, and/or a lower code rate, such as rate 1/2. It may also use a turbo code as its FEC encoding scheme. Or, alternatively, the robust mode may employ a concatenated code forward error correction (FEC) using a modified, block-interleaved version of one of the DVB-S standard codes. For this case, upon receipt by subscriber unit 104, decoder 114 may employ a separate, on chip DVB-S FEC decoder to decode robust mode channel symbol packets. In the exemplary embodiment, decoder 114 employs a turbo decoder and a DVB-S FEC decoder concurrently for parallel processing, although in alternative embodiments, a single decoder (such as a turbo decoder) may be employed to process both throughput mode channel symbol packets and robust mode channel symbol packets. Thus, the length of a payload packet (i.e., the number of channel symbols) encoded in a particular mode is unique to that mode of operation. Although the exemplary embodiment depicted in FIGS. 2A and 2B depicts support for at least two modes (robust and throughput), the present invention is capable of supporting any number of modes. However, because the invention employs unique words to identify a subset of all the modes supported, where the subset is less than all of the modes supported, each mode within the subset can be easily ascertained, as discussed more fully below.

Figure 3:
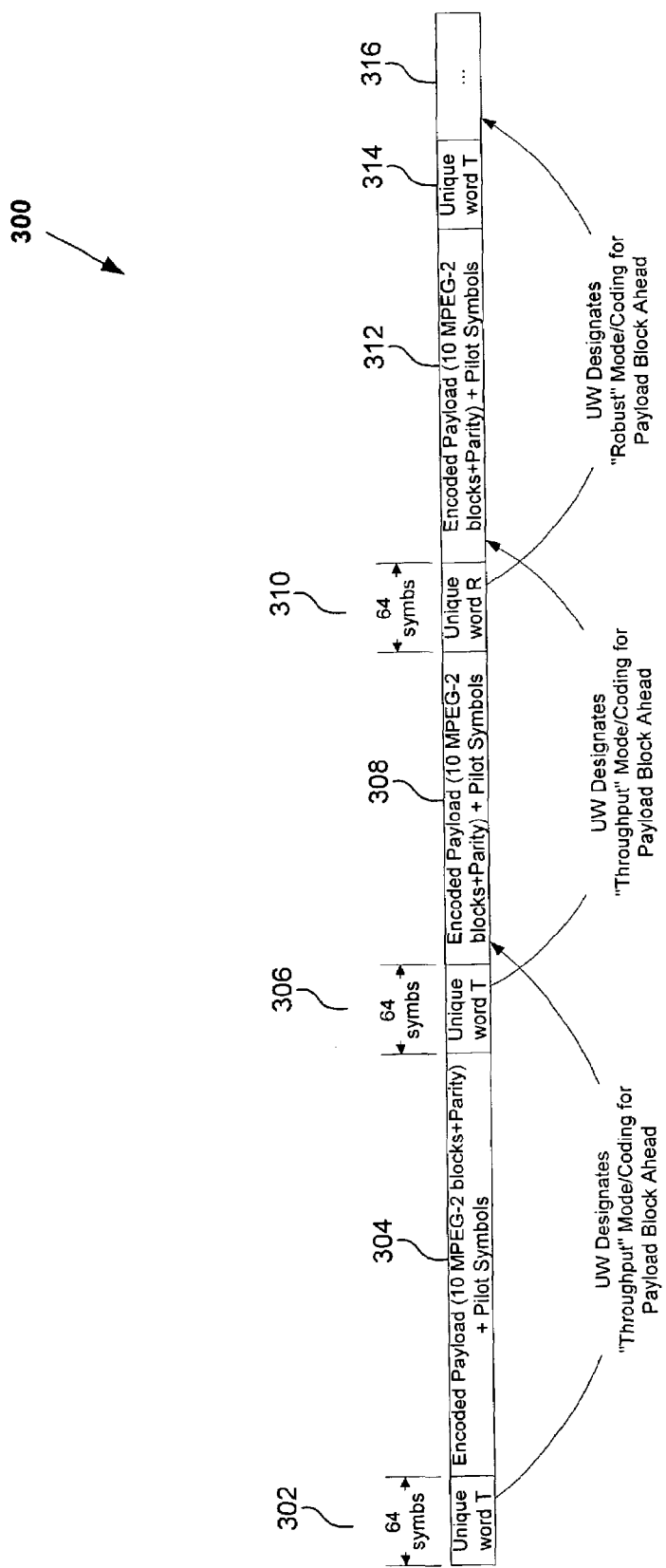
FIG. 3 illustrates an exemplary transmit sequence generated in accordance with one embodiment of the present invention.

Referring now to FIG. 3, there is shown exemplary transmit sequence 300 generated by encoder 108 of service provider unit 102 in accordance with one embodiment of the present invention. In accordance with the invention, a unique word is placed between each encoded payload packet, as shown in transmit sequence 300. For example, unique word T 302 precedes encoded payload packet 304, unique word T 306 precedes encoded payload packet 308, unique word R 310 precedes encoded payload packet 312, and unique word 314 precedes encoded payload packet 316.

In the particular embodiment shown in FIG. 3, each unique word 302, 306, 310 and 314 is 64 symbols long and, can, for example, be drawn from a QPSK channel symbol alphabet. A unique word is defined for each mode supported. Thus, in the exemplary embodiment where a throughput mode and a robust mode are supported, unique word T 302, unique word T 306, and unique word T 314 may be used to identify or signal the throughput mode, and unique word R 310 may be used to identify or signal the robust mode. In the particular embodiment shown in FIG. 3, each unique word 302, 306, 310 and 314 identifies or signals the mode of a subsequent encoded payload packet at least one packet in advance. For example, unique word T 302 identifies the mode of encoded payload packet 308 as throughput mode, i.e., encoded payload packet 308 is a throughput mode channel symbol packet. Similarly, unique word T 306 identifies the mode of encoded payload packet 312 as throughput mode, and unique word R 310 identifies the mode of encoded payload packet 316 as robust mode, i.e., encoded payload packet 316 is a robust mode channel symbol packet. With this signaling arrangement, both the decoder(s) associated with decoder 114 are provided with sufficient configuration time to prepare for the arrival of the packet to be processed.

According to another feature of the invention, unique words 302, 306, 310 and 314 comprise symbols which allow subscriber unit 104 to process each unique word 302, 306, 310 and 314 without delay, using correlators, for example, and to discriminate between which of the two or more unique words was most likely to have been transmitted. Moreover, unique words 302, 306, 310 and 314 are structured to promote synchronization, rather than require synchronization. By indicating the location of FEC code blocks, they enable the receiver to synchronize the deinterleavers used in the decoders of these blocks. An important issue affecting synchronization acquisition is that frequency offsets may be large when a receiver is powered up. In such a situation, correlation using differential decoding statistics may be preferred (over coherent statistics) to discriminate between unique words. For this reason good unique word design practice might ensure that the cross-correlation between unique words is significantly low in both coherent and differential modes. This enables easy discrimination between unique words for robust mode and unique words for throughput mode in both acquisition and tracking modes of operation. Furthermore, a good design for unique words 302, 306, 310 and 314 uses structures that have very strong local autocorrelation properties so that a correlator executed by subscriber unit 104 searching a serial symbol stream for unique words is able to quickly, and unambiguously, detect their location. With strong autocorrelation properties in differential mode, subscriber unit 104 is able to quickly synchronize itself to the frame interval during acquisition, even when the carrier phase is unknown, and the frequency error has not completely been pulled in. Once the frame interval is known, the system can thereupon bootstrap itself, because modulation types are known, and the coherent phases in the unique words are known. Thus, phase and frequency may be quickly locked, even at low SNRs.

As discussed above, the number of source bits per packet is generally fixed and the same regardless of the mode, but each mode corresponding to a different code rate will deliver a distinct number of channel symbols. Thus, the robust mode will generally include a larger number of channel symbols than the throughput mode. According to an exemplary embodiment, the interval between unique words can be used to "train" decoder 114 to recognize what code rate each of the unique words represents. For example, with reference to transmit sequence of FIG. 3, decoder 114 is able to determine the code rate associated with unique word T 302 by measuring the time interval between unique word T 306 and unique word R 310. Similarly, decoder 114 is able to determine the code rate associated with unique word R 310 by measuring the time interval between unique word 314 and the unique word following encoded payload 316 (not shown). The relationships between unique words and their associated code rates can be stored in a table for subsequent referencing. After acquisition, the system operator is able to change the mode settings (i.e., code rates and/or modulations) within a particular region by transmitting a few dummy packets with intervals associated with the new code rates, and force the receiver to re-acquire. Alternatively, the system operator is able to change the mode settings within a particular region by sending redefinition instructions within a packet (with an activation time stamp). According to another exemplary embodiment, unique modes may be defined in advance, and subscriber unit 104 may be pre-configured to correlate for unique words associated with those unique modes without requiring "training" of subscriber unit 104.

During startup, a table lookup is used to associate the interval between valid unique words with a valid code rate and/or modulation selection. The receiver is therefrom 'trained' as to the implication of receiving a given unique word, so that in the future when it sees that unique word it automatically sets up the decoder to operate using the proper code rate and modulation selection.

Figure 4:
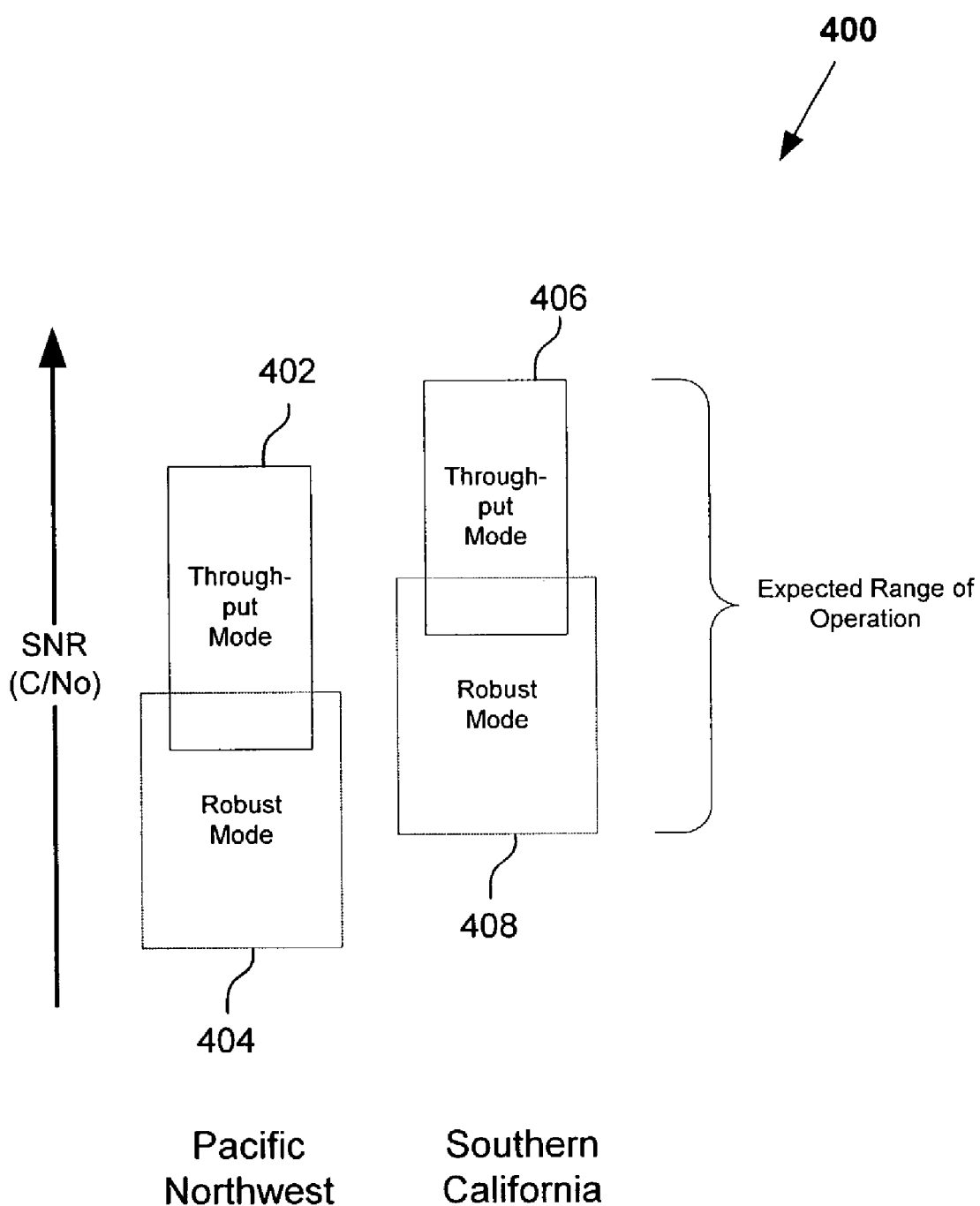
FIG. 4 illustrates an exemplary selection of distinct regional SNR settings for the throughput and robust modes in accordance with one embodiment of the present invention.

According to another feature of the invention, the actual rates used in throughput mode and robust mode can be different within different cells or spot beams, while employing the same unique words. Moreover, the superset from which the modulation/coding settings are taken can even be larger than ISDB-S because the superframe issues associated with ISDB-S discussed above are not present, thereby more perfectly tailoring the transmission environment to a cell. These advantages are significant because geographically, certain cells are likely to suffer greater rain fades, or signal interference, than others. For example, areas such as the Pacific Northwest and South Florida receive heavier rainfall and more frequent storms, than other regions of the United States, such as Southern California. Therefore, the modulation/coding selected for robust mode may be lower in those regions that receive heavier rainfall. FIG. 4 illustrates selection of distinct regional SNR settings 400 for the throughput and robust modes. In FIG. 4, the modulation/coding for throughput mode 406 in Southern California is higher than the modulation/coding for throughput mode 402 in the Pacific Northwest; likewise, the modulation/coding for robust mode 408 in Southern California is higher than the modulation/coding for robust mode 404 in the Pacific Northwest. Distinct regional SNR settings 400 also depict the use of hysteresis, which prevents subscriber unit 104 from bouncing back and forth between the two supported modes within a region.

Figure 5:
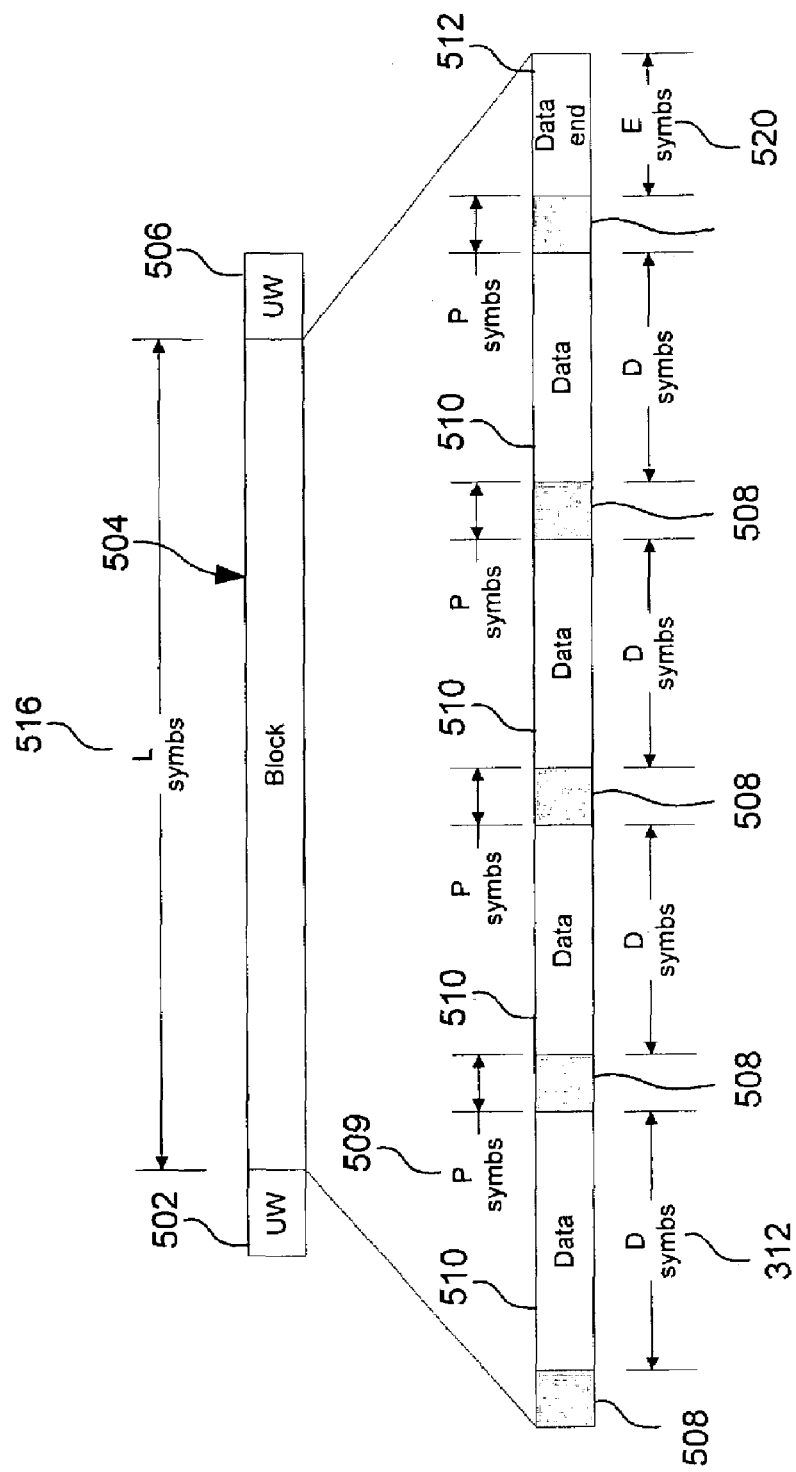
FIG. 5 illustrates a block diagram detailing an encoded payload packet of FIG. 3 in accordance with one embodiment of the present invention

Referring now to FIG. 5, there is shown a block diagram detailing encoded payload packet 504 corresponding to one of the encoded payload packets of transmit sequence 300 in FIG. 3 according to one embodiment of the present invention. As shown in FIG. 5, detailed encoded payload packet 504 is positioned between unique word 502 and unique word 506. Detailed encoded payload packet 504 includes a total of L symbols 516, which includes pilot symbols 508, data symbols 510, and partial data interval 512. Pilot symbols 508 comprise uncoded symbols, including P symbols 509, and are spaced in regular intervals within detailed encoded payload packet 504. Each data symbol 510 comprises D symbols 518 and is positioned between a corresponding pair of pilot symbols 508, and partial data interval 512 comprises E symbols 520 and is positioned at the end of detailed encoded payload packet 504. As FIG. 5 illustrates, pilot symbols 508 are known, uncoded, grouped in bursts, and spaced in regular intervals, and allow a particular subscriber unit 104 that is only capable of receiving robust mode packets to maintain (carrier) phase lock, even when receiving a throughput mode packet.

From the above description of exemplary embodiments of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is manifest that in certain embodiments, the number of modes may be increased to provide finer granularity of mode selection. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

Thus, an efficient communication system for reliable frame transmission over broad SNR ranges has been described.

What is claimed is:

1. A service provider unit operable in a satellite communication system, said service provider unit comprising:
   an encoder configured to encode source data into a serial transmit sequence, said encoder capable of supporting a throughput mode of operation and a robust mode of operation, said serial transmit sequence including a first unique word identifying said throughput mode of operation, said serial transmit sequence further including a first payload packet having a first number of channel symbols corresponding to a source packet encoded in accordance with said throughput mode of operation identified by said first unique word, said first payload packet being encapsulated between two unique words;

a transmitter configured to transmit said serial transmit sequence to a subscriber unit via a satellite transmission channel, wherein said throughput mode of operation, identified by said first unique word, can be determined by detecting a time interval between said two unique words;

wherein said serial transmit sequence further includes a second unique word identifying said robust mode of operation, said serial transmit sequence further including a second payload packet having a second number of channel symbols corresponding to a source packet encoded in accordance with said robust mode of operation identified by said second unique word, said second payload packet being encapsulated between two unique words;

wherein said encoder is configured to select one of said robust mode of operation and said robust mode of operation for a present source packet based on conditions of said satellite transmission channel and independent of a mode of operation selected for encoding an immediately prior source packet.

2. The service provider unit of claim 1, wherein said robust mode of operation, identified by said second unique word, can be determined by detecting a time interval between said two unique words encapsulating said second payload packet.

3. The service provider unit of claim 1, wherein said throughput mode is used for a higher signal-to-noise ratio than that of said robust mode.

4. The service provider unit of claim 3, wherein 8-PSK modulation is used for said throughput mode.

5. The service provider unit of claim 3, wherein a turbo code is used for said throughput mode.

6. The service provider unit of claim 1, wherein one of said two unique words is said first unique word.

7. The service provider unit of claim 1, wherein a turbo code or concatenated code FEC is used for said robust mode.

8. The service provider unit of claim 1, wherein one of said through mode of operation and robust mode of operation is selected for encoding said present source packet independent of a mode of operation selected for encoding an immediately following source packet.

9. The service provider unit of claim 1, wherein each of said through mode of operation and robust mode of operation has a unique number of channel symbols.

10. The service provider unit of claim 1, wherein said first payload packet further comprises a plurality of data blocks, each of said plurality of data blocks being separated by uncoded pilot symbols, said uncoded pilot symbols being spaced in regular intervals within said first payload packet.

11. A subscriber unit operable in a satellite communication system, said subscriber unit comprising:

a receiver configured to receive a serial transmit sequence, said serial transmit sequence including a first unique word identifying a throughput mode of operation, said serial transmit sequence further including a first payload packet having a first number of channel symbols corresponding to a source packet encoded in accordance with said throughput mode of operation identified by said first unique word, said first payload packet being encapsulated between two unique words;

a decoder configured to determine said throughput mode of operation identified by said first unique word by detecting a time interval between said two unique words;

wherein said serial transmit sequence further includes a second unique word identifying a robust mode of operation, said serial transmit sequence further including a second payload packet having a second number of channel symbols corresponding to a source packet encoded in accordance with said robust mode of operation identified by said second unique word, said second payload packet being encapsulated between two unique words;

wherein said robust mode of operation and said robust mode of operation for a present source packet is selected based on conditions of a satellite transmission channel and independent of a mode of operation selected for an immediately prior source packet.

12. The subscriber unit of claim 11, wherein said decoder is further configured to decode said first payload packet in accordance with said throughput mode of operation identified by said first unique word.

13. The subscriber unit of claim 11, wherein said decoder is further configured to determine said robust mode of operation identified by said second unique word by detecting a time interval between said two unique words encapsulating said second payload packet.

14. The subscriber unit of claim 13, wherein said decoder is further configured to decode said second payload packet in accordance with said robust mode of operation identified by said second unique word.

15. The subscriber unit of claim 11, wherein said throughput mode is used for a higher signal-to-noise ratio than that of said robust mode.

16. The subscriber unit of claim 15, wherein said decoder comprises a turbo decoder for decoding packets encoded in said throughput mode.

17. The subscriber unit of claim 11, wherein one of said two unique words is said first unique word.

18. The subscriber unit of claim 15, wherein said decoder comprises a separate on-chip DVB FEC decoder for decoding packets encoded in said robust mode.

19. The subscriber unit of claim 17, wherein said decoder comprises one of a turbo decoder or an iterative decoder for decoding packets encoded in said robust mode.

20. The subscriber unit of claim 11, wherein said first payload packet further comprises a plurality of data blocks, each of said plurality of data blocks being separated by uncoded pilot symbols, said uncoded pilot symbols being spaced in regular intervals within said first payload packet.

* * * * *